Dec. 14, 1937.   G. H. WATERMAN   2,102,230
EXPANSION BOLT
Filed July 24, 1936
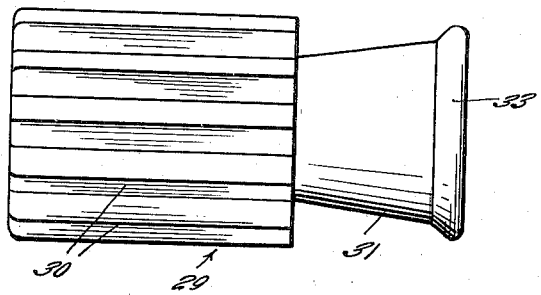
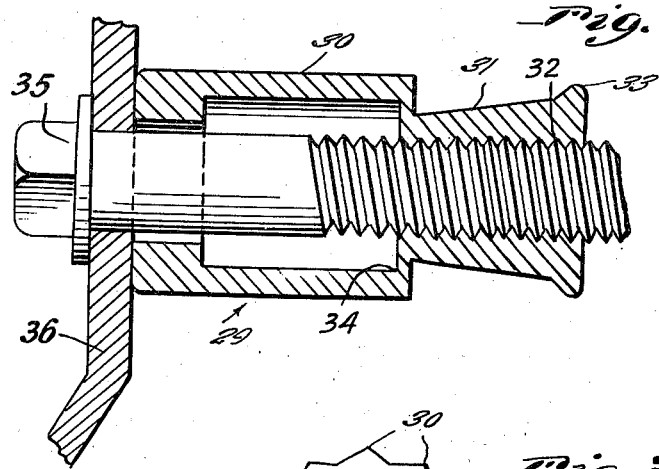
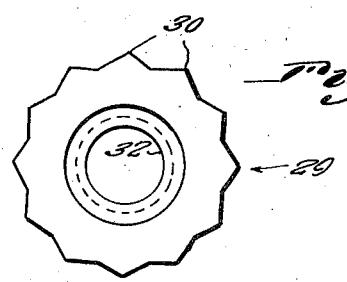
Inventor
G. H. Waterman
By Clarence A. O'Brien
Hyman Berman
Attorneys Patented Dec. 14, 1937

2,102,230

UNITED STATES PATENT OFFICE 2,102,230

EXPANSION BOLT

George Henry Waterman, Wyomissing, Pa.

Application July 24, 1936, Serial No. 92,339

1 Claim. (Cl. 85—2.4)

This invention relates to that classification of mechanical elements and fasteners generally alluded to as wall attaching studs, bolts, and the like, designed to accommodate hanger fixtures and other structures intended to be secured to the wall.

Needless to say, I am aware of the fact that it is common in this particular line of endeavor to drill a brick or concrete wall and to anchor therein a projecting threaded stud or bolt. I am also aware of the fact, however, that the socket drilled in the wall to accommodate the stud or other device cannot always be formed with requisite accuracy. Consequently, in brick and concrete walls in particular, the anchoring facilities are not especially efficient or dependable.

The purpose of the present invention is to generally improve upon known prior art and market the devices in this classification by providing an arrangement which is characterized by appreciable refinements and structural distinctions, and other noteworthy advantages and improvements.

Briefly, and by way of contrast with the recognized prior art structures, the present invention has to do with the adoption and use of a sleeve-like or tubular fitting which is inserted into the drilled socket in the wall and externally fluted or otherwise roughened to facilitate anchorage, the same being associated with an integral expanding cone and a stud carried by the cone for actuating it to obtain the desired security of stud anchorage.

Figure 1 is a side elevational detail view of the major part or unit of the structural assemblage showing a preferred construction and arrangement of features.

Figure 2 is a longitudinal sectional view taken through the structure seen in Figure 1.

Figure 3 is an end view, that is, an end elevational view, showing the fluted or ribbed surface formation of the so-called anchoring sleeve or shell.

Referring to the accompanying drawing the basic element of the invention is a brass or steel cylindrical or hollow shell forming the body of the anchoring unit and designated by the numeral 29. The shell 29 is externally fluted to provide longitudinal fins or ribs 30. At the rear end of the shell is an integral conical expanding nut 31 which may be smooth or otherwise externally finished. The nut 31 is provided with internal threads 32 and an outstanding annular end flange 33 and is joined to the shell 29 by a fragile annulus 34 providing a disruptable connection between the said nut 31 and the adjacent end portion of the shell 29. A nut adjusting bolt 35 is screwed into the nut 31 from the front end of the shell 29 and has mounted thereon between the said front end and the head of said bolt the usual hanger, or wall fixture, 36. By screwing the bolt 35 inwardly the annulus 34 is disrupted, the nut 31 drawn inwardly of the shell 29 and the inner end of the latter expanded in the wall socket, not shown, and thereby anchored therein. The advantage of having the shell 29 fluted is that this feature makes it possible to bore a hole in the wall smaller in diameter than the cross-sectional diameter of the shell 29. Thus, by taking a hammer or the like it is possible to drive the shell 29 home, the ribs 30 cutting through the wall of the socket 8 in the latter. This arrangement has its advantages not only from the standpoint of use, but from the standpoint of manufacturing, since it is possible to make the product of brass rods drawn through a double hex-shaped die.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a structure of the class described, a body cylindrical in cross-sectional form provided on its peripheral surface with fins circumferentially spaced and forming longitudinal retaining ribs extending from end to end of said body, and a conical nut attached by an annular rib to one end of said body, said annular rib being breakable to permit longitudinal movement of the nut into the body to expand the latter, said nut being provided on its outer end with an outstanding lateral flange.

GEORGE HENRY WATERMAN.